EDMUND AUGUSTIN CHAMEROY, OF PARIS, FRANCE.

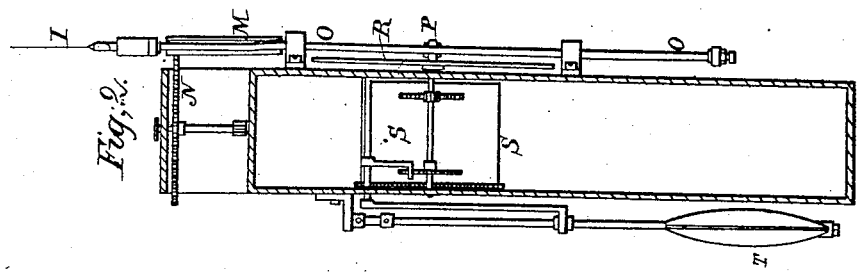
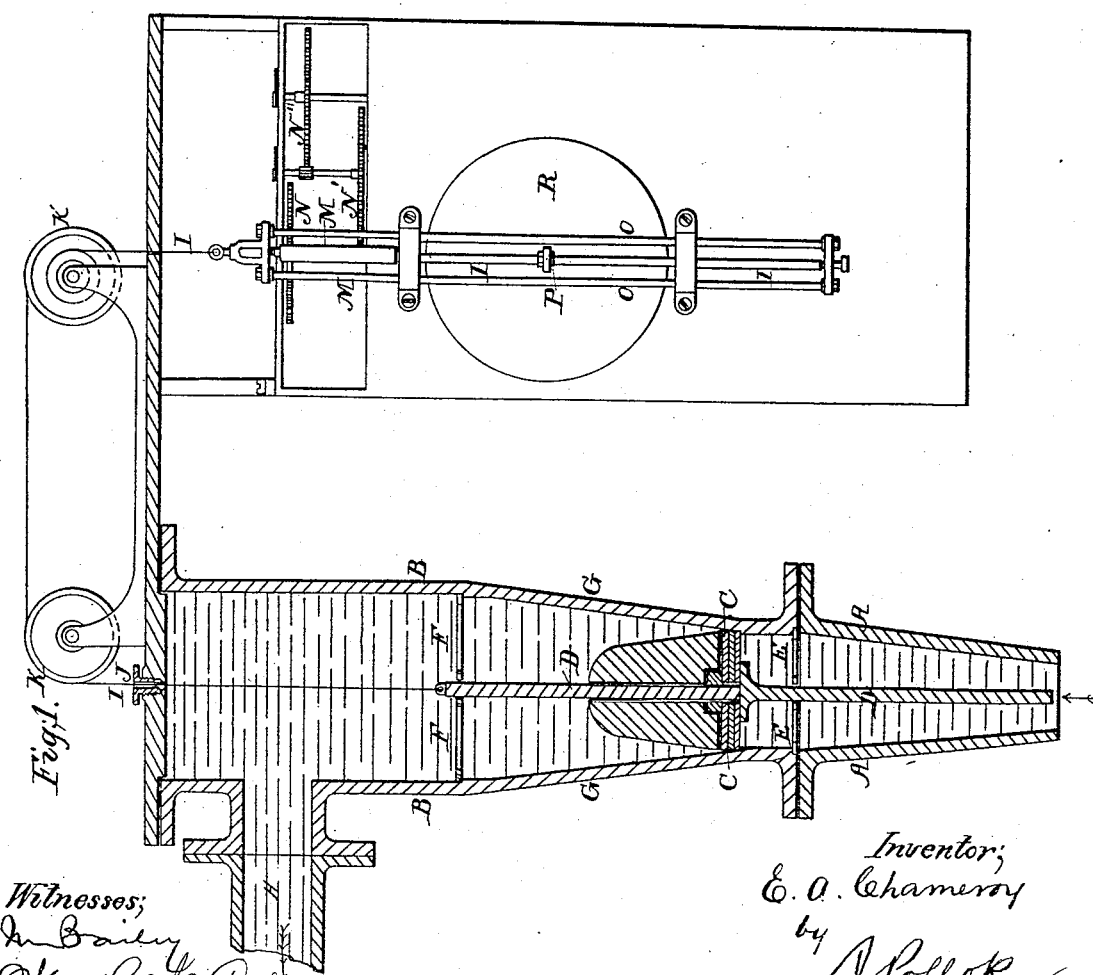

*Letters Patent No. 84,476, dated December 1, 1868.*

IMPROVEMENT IN FLUID-METERS.

The Schedule referred to in these Letters Patent and making part of the same.

*To whom it may concern:*

Be it known that I, EDMUND AUGUSTIN CHAMEROY, of Paris, in the Empire of France, have invented a certain new and improved Liquid or Gas-Meter; and I hereby declare the following to be a full, clear, and exact description of the same, reference being had to the accompanying drawings.

The novelty of the invention embodied in this gas and liquid-meter, which I denominate "A Piezometric Meter," consists, essentially, in a new application of the law which governs the flow of liquids or fluids, by which means I am enabled, in the construction of the meter, to dispense with ordinary mechanisms, such as pistons, cocks, turbines, wheels, and with all apparatus depending upon the capacity or size of the meter-chamber to measure liquid or gas.

This meter is especially adapted to indicate the volume of water, gas, or any fluid passing through either the main or distributing-conduits in cities, or those pipes or conduits which branch off to dwellings, &c., or it may be employed to determine the volume of water flowing through canals, whether used for purposes of navigation or of irrigation.

Before proceeding to a detailed description, I would premise that the essential principle involved in my invention consists in the method of determining the volume of liquid or fluid flowing with a constant pressure through an orifice or opening of variable size, by determining or ascertaining in an exact manner, by means of a varied movement, arising from the uniform oscillation of a pendulum or any other motor, the different changes in the size of the opening through which the liquid or fluid passes.

To enable others skilled in the art to understand and use my invention, I will proceed to describe the manner in which the same is or may be carried into effect, by reference to the accompanying drawings, in which—

Figure 1 is a side view, partly in section, of a water-meter, made in accordance with my invention.

Figure 2 is an end view of the same.

In this apparatus—

A is the pipe for the admission of the water.

B is the metallic shell of the meter.

C is the weighted distributing-valve, resting on a shoulder, of small dimensions, formed in the interior of the lower part of the conical tube G.

D D represent the guide-rod, on which the valve is mounted, passing through the two cross-pieces, F F.

G is the conical tube, connecting the two parts, A B. Within it is placed the valve-piece C, under such an arrangement that the higher the latter is raised by the pressure of the water beneath, the larger will become the annular space between the valve and the flaring or diverging sides of the conical tube G through which the water passes.

H is the opening through which the water is discharged from the apparatus.

To the upper end of the valve-rod D is attached a metal thread or wire, I, passing out from the top of the apparatus, through a stuffing-box, J, and intended for transmitting the movement of the valve to the registering-mechanism.

The wire passes over pulleys K, and its other end is attached to the axis L of the counter-weight O.

On the upper end of this axis or shaft L is mounted a pinion, M, gearing with a toothed wheel, N, mounted on the frame, in rear of the counter-weight.

$N^1$ $N^2$ $N^3$ $N^4$, are registering-dials, geared with the wheel N, and used for registering the number of revolutions of the pinion M.

The counterpoise of the weighted valve C is formed of two rods, O, mounted, one on each end of the shaft L.

The latter carries a small disk, P, which is capable of rotating upon the axis of the shaft.

And just in rear of, and in contact with the periphery of the disk, is a circular plate, R, mounted upon a rod, which is revolved by clock-work S.

The plate is so arranged that when the valve C is completely closed the disk P will be in contact with the centre of the plate.

The clock-work communicates to the plate R the regular and uniform movement of a pendulum, T, with an ordinary escapement.

This clock-mechanism serves as the motor of the wheels R P M, and consequently of the indicators $N^1$ $N^2$ $N^3$ $N^4$.

The operation of the apparatus is as follows:

All the water which enters the conduit A, and passes out through the orifice H, must necessarily pass through the meter, and consequently during that time, in which there is no pressure of water from below, the valve C will remain in its seat, the thread I and pulleys K will transmit no movement to the rod L, the disk P will remain motionless at the centre of the revolving plate R, and the pinion M will not register on the dials $N^1$ $N^2$ $N^3$ $N^4$ any movement of rotation; whence it will be seen that if there is no consumption of water there will be no movement of the indicating-dials.

If, on the other hand, the pressure be increased, the water, acting on the valve, will raise it until the annular orifice around the valve is sufficiently large for the required flow of water.

Now, as the surface of the valve C and its net weight (deducting the counter-weight O) are the only obstacles to the passage of the water, it will readily be understood that the ascending movement of the valve will cease exactly at the point where the piezometric height, or, in other words, the difference between the pressure below and above the valve, will equilibrate the weight.

This difference in pressure, $h$, will be constantly the same, whatever may be the position of the valve. The velocity ($V = \sqrt{2gh}$) of the liquid passing through the variable opening, underneath the weight, will vary in no greater degree, and the volume of water passing through, measured by the formula $q = S\ V$, will be proportional to the annular space around the valve. It will be sufficient, therefore, to determine the successive variations of the annular surfaces, in order to determine the volume of water which has passed through.

To attain this result, I make use of a clock-movement which imparts to the plate R a continuous and regular rotation.

I have above stated that in case the valve C is at rest, the disk P, which bears against the centre of the plate R, will transmit no rotary motion to the pinion M and indicating-dials. But when the valve C is elevated to a height proportionate to the flow of the water, the disk P, by means of the thread I, will be displaced from the centre of the plate R, and the frictional contact between the revolving plate and the disk will now impart to the latter a rotary movement, increasing in direct proportion to the departure of the disk from the centre of the plate, and this rotary motion of the disk will be communicated, through the shaft L and pinion M, to the registering-dials $N^1\ N^2\ N^3\ N^4$. As soon as the pressure of water ceases, the valve C, dropping back into its seat, will bring back the various pieces M P L R I to their normal positions, and thus arrest all further movement of the registering-mechanism.

The figures on the dials will now indicate the volume of water which has passed through the apparatus.

In effect, the little disk P, actuated by the friction of the plate R, receives from the latter velocities which augment in proportion to its departure from the centre. But this departure is the direct result of the vertical displacement of the valve, which is always proportional to the different annular surfaces, and consequently to the volume of water discharged in a given time.

The number of revolutions made by the disk, and which is indicated by the dial, will therefore measure the excess of water passing up from below the valve, one revolution representing a determinate volume of discharged water.

The volume taken for a unit will be one cubic meter, or a fraction of a cubic meter, according to the force of the water and the regulation of the apparatus.

The only difference in the construction of this meter for large and small consumers will be in the dimensions of the valve C and the conical part G of the meter-case.

The registering-mechanism can always be the same, whatever may be the volume of water to be measured.

An apparatus of this kind requires but little head of water in order to operate, and it can of course be used for the measurement of gas and other fluids, as well as of liquids.

It will be seen, also, that I am enabled to dispense with the use of the pistons, stop-cocks, wheels, and other appliances ordinarily employed in meters, which have the disadvantage of soon becoming rusty, and losing that adjustment needed for the proper working of the apparatus, besides often requiring a very considerable pressure of water before they can operate.

Having now described my invention, and the manner in which the same is or may be carried into effect,

What I claim, and desire to secure by Letters Patent, is—

The combination, with the tapering valve-chamber, the weighted valve, and valve-rod, connected with the counter-weight O, as described, and the pinion M and disk P, mounted upon the shaft I of said counter-weight, of the registering-mechanism and the rotary plate R, actuated by clock-work, under the arrangement and for operation as herein shown and set forth.

In testimony whereof, I have signed my name to this specification before two subscribing witnesses.

E. A. CHAMEROY.

Witnesses:
C. LAFOND,
F. OLCOTT.